（12） United States Patent
Whalin

(10) Patent No.: US 6,357,433 B1
(45) Date of Patent: Mar. 19, 2002

(54) MACHINE FOR CUTTING BRITTLE MATERIALS

(75) Inventor: Jeffery A. Whalin, Fountain Hills, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/585,215

(22) Filed: Jun. 1, 2000

(51) Int. Cl.$^7$ .................................................. B28D 1/02
(52) U.S. Cl. ................ 125/16.01; 457/16.02; 457/12; 457/17; 492/27; 403/258
(58) Field of Search ............... 125/16.01–16.02, 125/12, 16, 18, 21, 35; 492/27; 451/173, 296, 311; 403/258, 260, 337

(56) References Cited

U.S. PATENT DOCUMENTS

| | | | |
|---|---|---|---|
| 3,639,959 A | * | 2/1972 | Bagley et al. ................ 29/132 |
| 3,704,734 A | * | 12/1972 | Soto et al. .................... 145/29 |
| 3,831,576 A | | 8/1974 | Mech |
| 3,942,508 A | | 3/1976 | Shimizu |
| 3,957,028 A | | 5/1976 | Lesiourd et al. |
| 4,197,680 A | * | 4/1980 | Althen et al. ................ 451/475 |
| 5,575,189 A | * | 11/1996 | Kiuchi et al. ............ 125/16.01 |
| 5,906,192 A | * | 5/1999 | Wakuda .................... 125/16.01 |
| 5,910,203 A | * | 6/1999 | Hauser ..................... 125/16.01 |
| 6,155,742 A | * | 12/2000 | Yang et al. ................. 403/337 |

OTHER PUBLICATIONS

Machinery's Handbook, by Erik Oberg, Franklin D. Jones, Holbrook L. Horton and Henry H. Ryffel, 24$^{th}$ Edition, preface, p926 and 930.
HCT Shaping Systems Sa Brochure regarding Wire Saw Technology.

* cited by examiner

Primary Examiner—George Nguyen
(74) Attorney, Agent, or Firm—Kevin D. Wills; William E. Koch

(57) ABSTRACT

A machine for cutting brittle materials includes a mandrel or shaft (200) having a first portion (310) with a taper, a sleeve (400) having an inner surface (410) and an outer surface (420) where the inner surface has the taper and is located adjacent to the first portion of the shaft, and a coating (890) around the outer surface where the coating has grooves (1010) extending around the sleeve.

22 Claims, 4 Drawing Sheets

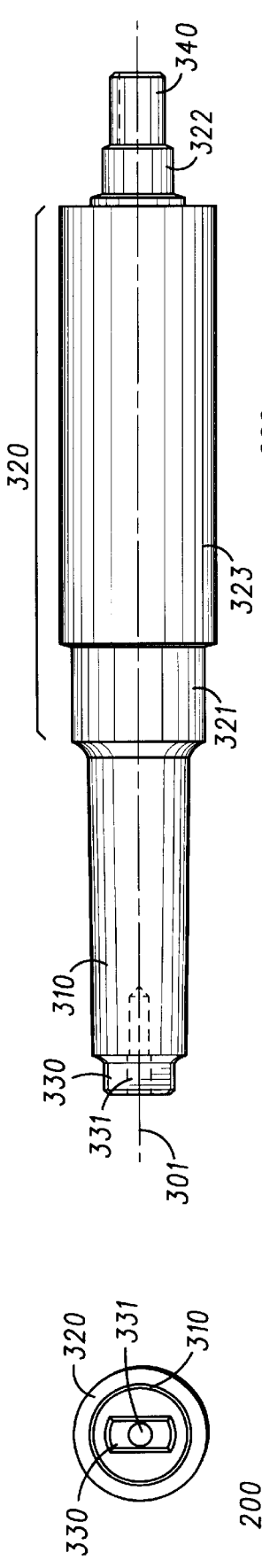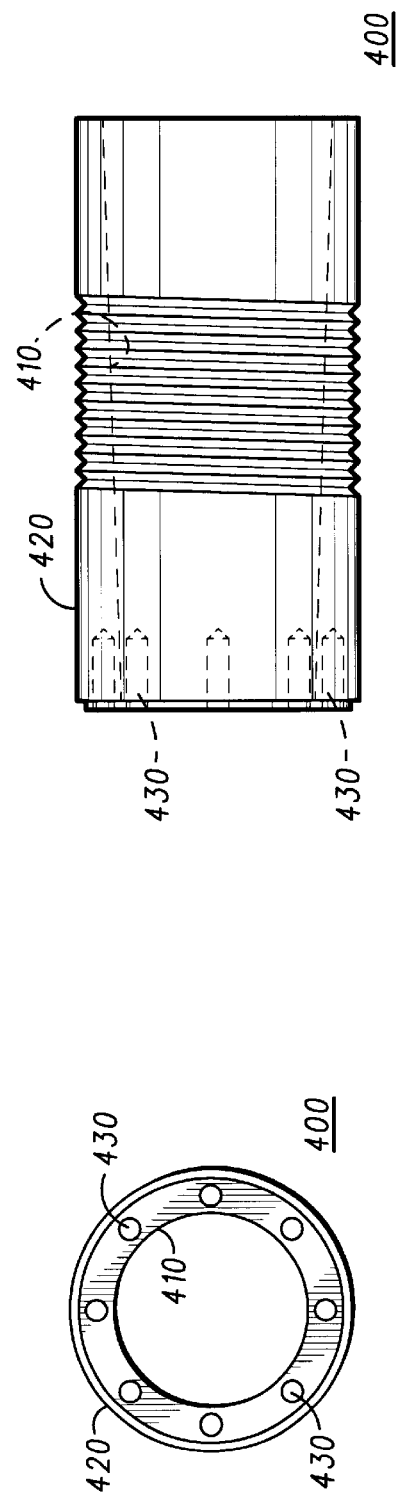
FIG. 3
FIG. 2
FIG. 5
FIG. 4

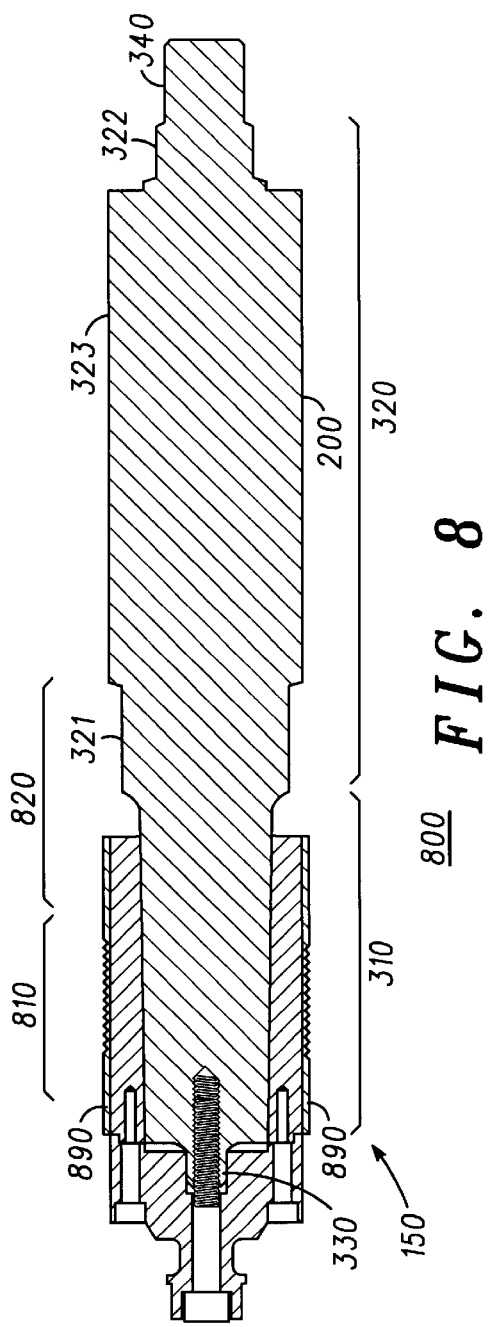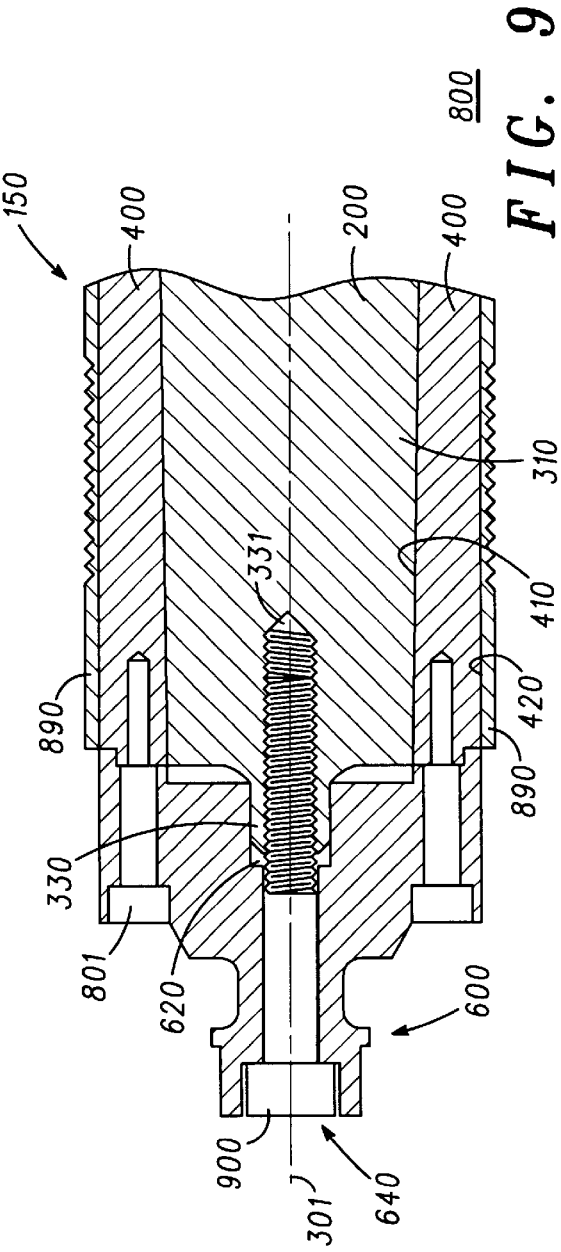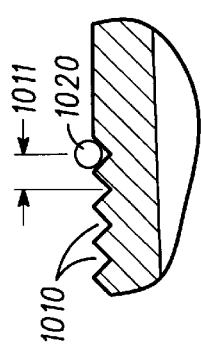

MACHINE FOR CUTTING BRITTLE MATERIALS

FIELD OF THE INVENTION

This invention relates, in general, to machines for cutting brittle materials, and more particularly, to wire saws for cutting semiconductor boules into semiconductor wafers.

BACKGROUND OF THE INVENTION

Wire saws are used to cut semiconductor boules into semiconductor wafers. An example of a wire saw is described in U.S. Pat. No. 3,831,576 (the '576 patent) issued on Aug. 27, 1974, invented by Harold W. Mech, and assigned to Motorola, Incorporated. FIG. 1 of the '576 patent illustrates a wire wrapped around three pulleys. Each pulley has a wire guide and a mandrel, and each wire guide has multiple grooves. The wire is wrapped around each wire guide multiple times and is located in the multiple grooves of each of the wire guides to define a work surface or cutting area. A semiconductor boule is cut into a plurality of semiconductor wafers at the cutting area.

The assembly of each of the three pulleys is not an easy process. For example, a hydraulic press is needed to press a wire guide onto a mandrel for each pulley. The hydraulic press can produce up to ten tons of force, which is applied between the wire guide and the mandrel to install the wire guide onto the mandrel. The mandrel and the wire guide are lubricated to decrease the insertion force caused by the interference fit between the mandrel and the wire guide. The technique of pressing the wire guide onto the mandrel stretches and deforms the inside surface of the wire guide to produce a slip-free interface between the wire guide and the mandrel. This slip-free interface enables the wire guides driven by the mandrels to move the wire across the cutting area.

However, the deformation of the inside surface of the wire guide can offset the concentricity of the wire guide to the mandrel. Furthermore, it is difficult to position the wire guide on the mandrel at a precise location, and this lack of precision may result in an inaccurate cutting width. Additionally, the removal of the wire guide from the mandrel damages the inside surface of the wire guide such that the wire guide cannot be reused.

Other tools exist to cut semiconductor boules into semiconductor wafers, but these tools are significantly larger machines with wire guides measuring as much as ten times greater than those of the '576 patent. The approach often used for these larger machines is to fabricate the wire guide in two opposing halves or "clam shells". Each of the clam shells contain pockets or counter-bore holes positioned along its longitudinal axis, and fasteners are located within these holes to hold the clam shells together. However, these features of the clam shells interrupt the grooves that hold and position the wire of the wire guide. This interruption in the grooves holding the wire may cause wire instability problems in smaller wire guides.

Accordingly, a need exists for a machine for cutting brittle materials that has pulleys, which can be assembled precisely and can be disassembled and reused without damaging the wire guides of the pulleys.

BRIEF DESCRIPTION OF THE DRAWINGS

The invention will be better understood from a reading of the following detailed description, taken in conjunction with the accompanying drawing figures in which:

FIGS. 2 and 3 illustrate front and side views, respectively, of a shaft or mandrel in the portion of the machine of FIG. 1 in accordance with an embodiment of the invention;

FIGS. 4 and 5 illustrate front and side views, respectively, of a sleeve in the portion of the machine of FIG. 1 in accordance with an embodiment of the invention;

FIG. 8 illustrates a cross-sectional view of a pulley in the portion of the machine of FIG. 1 in accordance with an embodiment of the invention;

FIG. 9 illustrates an enlarged cross-sectional view of a portion of the pulley in FIG. 8; and FIG. 10 illustrates an enlarged cross-sectional view of a portion of the pulley in FIG. 9.

Figure 1:
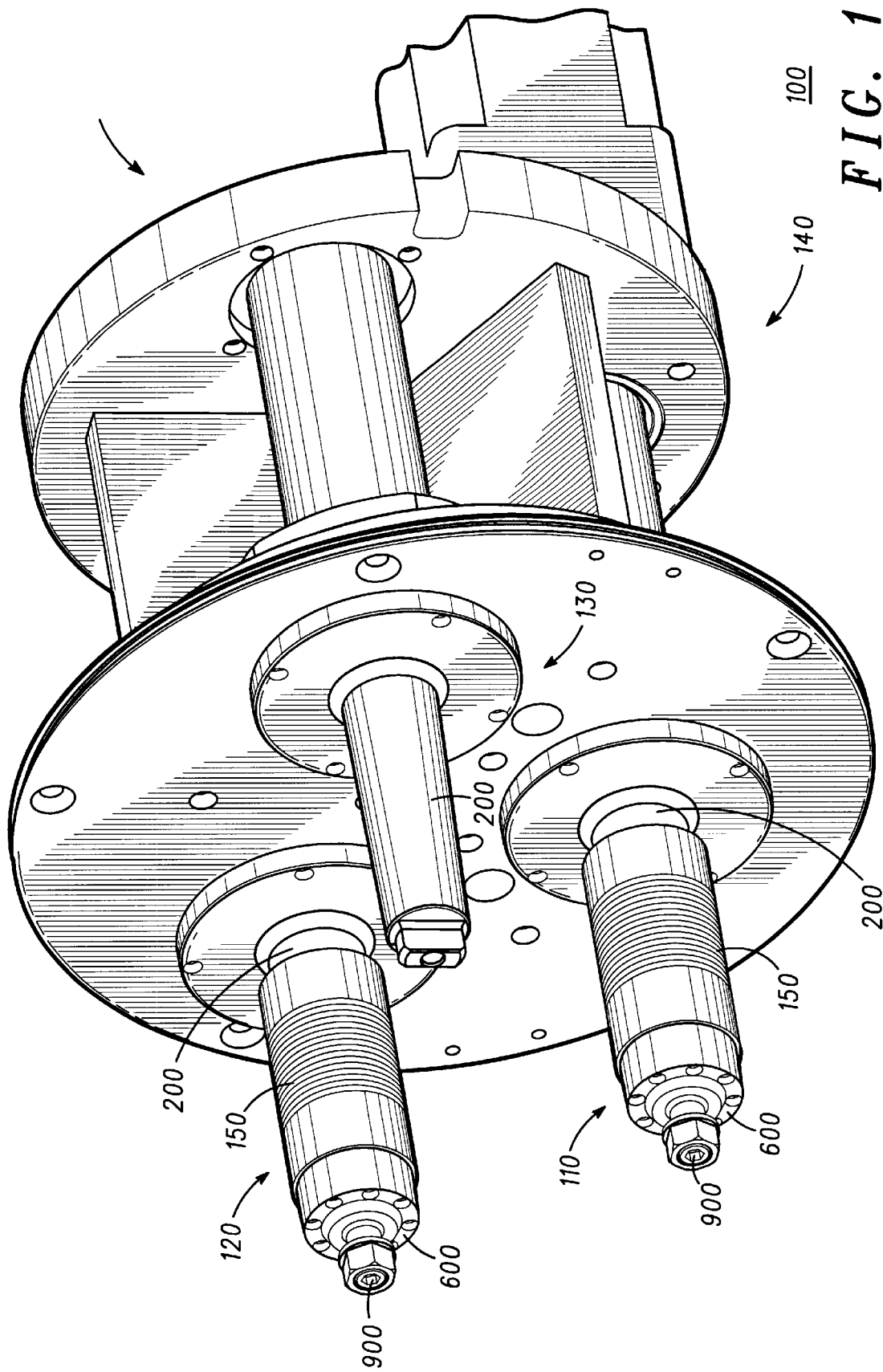
FIG. 1 illustrates an isometric view of a portion of a machine for cutting brittle materials in accordance with an embodiment of the invention.

For simplicity and clarity of illustration, the drawing figures illustrate the general manner of construction, and elements in the drawing figures are not necessarily drawn to scale. Additionally, the same reference numerals in different figures denote the same elements, and descriptions and details of well-known features and techniques are omitted to avoid unnecessarily obscuring the invention.

Furthermore, the terms first, second, third, front, back, over, under, and the like in the description and in the claims, if any, are used for descriptive purposes and not necessarily for describing relative positions. It is understood that the terms so used are interchangeable under appropriate circumstances and that the embodiments of the invention described herein are capable of operation in other orientations than described or illustrated herein.

DETAILED DESCRIPTION OF THE DRAWINGS

FIG. 1 illustrates an isometric view of a portion of a machine 100 for cutting brittle materials. The portion of machine 100 in FIG. 1 includes a frame 140 supporting a plurality of pulleys 110, 120, and 130. Only a portion of pulley 130 is illustrated in FIG. 1. As an example, pulleys 38, 36, and 37, respectively, in FIG. 1 of the '576 patent can be replaced by pulleys 110, 120, and 130, respectively, in FIG. 1 herein.

Each of pulleys 110, 120, and 130 include, among other features, a mandrel or shaft 200, a wire guide 150, a cap 600, and a fastener 900. Pulley 130 is illustrated without its wire guide, cap, or fastener. Additional details of pulleys 110, 120, and 130 are described in the subsequent drawing figures.

Each of pulleys 110, 120, and 130 are preferably symmetrical with each other. Accordingly, in the preferred embodiment, the shafts of each of pulleys 110, 120, and 130 are symmetrical with each other; the wire guides of each of pulleys 110, 120, and 130 are symmetrical with each other; the caps of each of pulleys 110, 120, and 130 are symmetrical with each other; and the fasteners of each of pulleys 110, 120, and 130 are symmetrical with each other.

A portion of a drive motor 160 is connected to the shaft of pulley 110. In the preferred embodiment, a motor is not connected to the shafts of pulleys 120 or 130. A wire (not illustrated in FIG. 1) is tightly wrapped around pulleys 110, 120, and 130 multiple times. The wire extends from pulley 110, to pulley 130, to pulley 120, to pulley 110, to pulley 130, to pulley 120, and so on. As motor 160 rotates pulley 110, the tension of the wire rotates pulleys 120 and 130. Thus, the shaft of pulley 110 is referred to as a drive shaft or a drive mandrel, and the shafts of pulleys 120 and 130 are referred to as slave shafts or slave mandrels.

As also illustrated in FIG. 1, pulleys 110, 120, and 130 preferably form an isosceles triangle where the sides of the triangle between pulleys 110 and 120 and between 110 and 130 are equal to each other. The side of the triangle between pulleys 120 and 130 forms the cutting surface or work area for cutting semiconductor boules into semiconductor wafers. One skilled in the art will understand that machine 100 is not limited to having only three pulleys, but can have two, four, five, or more pulleys to define the work area.

FIGS. 2 and 3 illustrate front and side views, respectively, of mandrel or shaft 200. Shaft 200 has a rotational axis along its length. The rotational axis is indicated by a dashed line 301 in FIG. 3. The rotational axis extends through a center or central portion of shaft 200, and shaft 200 rotates around the axis. In the preferred embodiment, the shaft is rigid and is comprised of stainless steel.

Shaft 200 includes a front end 330, a first portion 310, a second portion 320, and a back end 340. Portion 310 of shaft 200 preferably has a smooth surface to facilitate the insertion of the wire guide onto shaft 200. This smooth surface of portion 310 has a taper where the taper extends along the rotational axis of shaft 200. The taper can be a locking or non-locking taper. If the taper of portion 310 is a locking taper, the taper can assist in the locking of a wire guide onto portion 310 of shaft 200. As an example, the taper can be greater than zero degrees and less than approximately five degrees, as measured from the rotational axis. In the preferred embodiment, the taper is approximately two to three degrees and is referred to as a Brown & Sharpe Number 11 Taper. This preferred taper was chosen to standardize the fabrication process and was dimensionally suitable for this application. Accordingly, one skilled in the art will understand that other locking tapers can be used.

End 330 of shaft 200 is located adjacent to portion 310 and has a first configuration. In the preferred embodiment, the first configuration is the shape of a tang. End 330 also has a hole 331 that is preferably substantially collinear with the rotational axis. In FIG. 3, hole 331 is indicated by a dashed line. Hole 331 extends through end 330 and into portion 310.

Portion 320 of shaft 200 is located adjacent to portion 310 at an opposite side of portion 310 from end 330. Portion 320 includes sections 321 and 322 that are supported by frame 140 in FIG. 1. Portion 320 also includes a main body 323 between sections 321 and 322. Portion 320 is devoid of a taper.

As an example, shaft 200 can have a length of approximately 30 to 40 centimeters. End 330 can have a length of approximately 1 to 3 centimeters, and end 340 can have a length of approximately 2 to 4 centimeters. Section 321 can have a length of approximately 3 to 4 centimeters; section 322 can have a length of approximately 1 to 2 centimeters; and body 323 can have a length of approximately 14 to 17 centimeters. Portion 310 can have a length of approximately 10 to 13 centimeters and a diameter of approximately 2 to 4 centimeters.

FIGS. 4 and 5 illustrate front and side views, respectively, of a hollow body or tubular sleeve 400 that is a portion of wire guide 150 in FIG. 1. As illustrated in FIGS. 4 and 5, sleeve 400 has an inner surface 410 and an outer surface 420. In FIG. 5, inner surface 410 is illustrated by dashed lines. Inner surface 410 defines the hollow portion of sleeve 400. Inner surface 410 is preferably substantially smooth and has a locking taper. In the preferred embodiment, the taper of inner surface 410 is the same as the taper of portion 310 of shaft 200 in FIG. 3.

Sleeve 400 in FIGS. 4 and 5 also includes a plurality of holes 430 that are used to couple cap 600 (FIG. 1) to sleeve 400. In FIG. 5, holes 430 are illustrated by dashed lines. In the preferred embodiment, sleeve 400 is rigid and is comprised of stainless steel such that inner surface 410 of sleeve 400 is not deformed when sleeve 400 is inserted onto or removed from portion 310 of shaft 200. As an example sleeve 400 can have a length of approximately 7 to 10 centimeters, and the wall of sleeve 400 can have thickness of approximately 5 to 10 millimeters.

Figure 6:
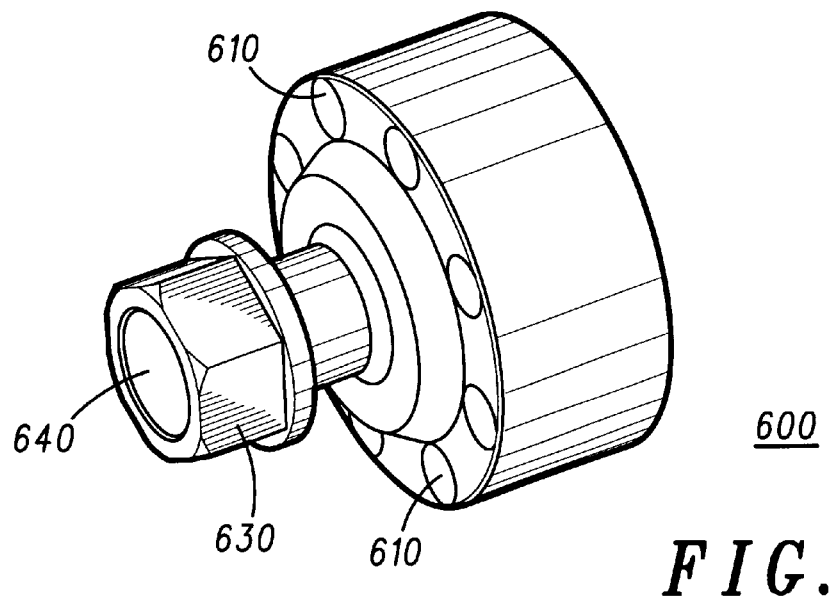
FIGS. 6 and 7 illustrate front and back isometric views, respectively, of a cap in the portion of the machine of FIG. 1 in accordance with an embodiment of the invention.
Figure 7:
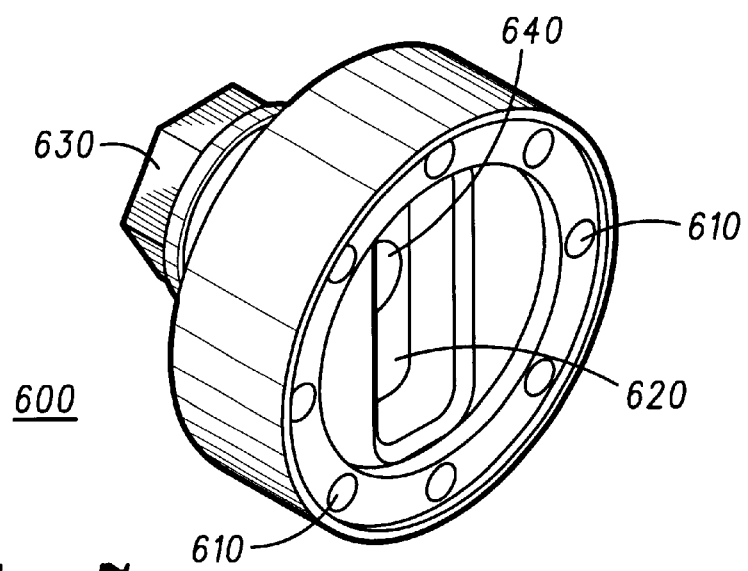

FIGS. 6 and 7 illustrate front and back isometric views, respectively, of cap 600. In the preferred embodiment, cap 600 is rigid and is comprised of stainless steel. Cap 600 includes a plurality of holes 610 that are used to couple cap 600 to sleeve 400 in FIGS. 4 and 5. Holes 610 of cap 600 in FIGS. 6 and 7 are aligned to holes 430 of sleeve 400 in FIGS. 4 and 5, and fasteners are inserted into holes 610 and 430 to couple together cap 600 and sleeve 400.

Cap 600 also includes a slot, groove, or recess 620. Recess 620 has a second configuration to receive end 330 of shaft 200 (FIGS. 2 and 3) in a finite number of orientation to prevent sleeve 400 (FIGS. 4 and 5) and cap 600 from slipping around shaft 200. In the preferred embodiment, recess 620 can receive end 330 in one of only two orientations.

Cap 600 also includes an end 630 that has a polygon shape. End 630 facilitates the insertion and removal of fastener 900 in FIG. 1. Cap 600 further includes a hole 640 that extends through end 630 and also through recess 620.

FIG. 8 illustrates a cross-sectional view of one of pulleys 110, 120, or 130 in FIG. 1. FIG. 9 illustrates an enlarged cross-sectional view of the pulley in FIG. 8. As illustrated in FIGS. 8 and 9, when sleeve 400 is inserted onto portion 310 of shaft 200, outer surface 420 of sleeve 400 is substantially parallel to the rotational axis indicated by dashed line 301. Furthermore, portion 310 of shaft 200 extends through sleeve 400 such that inner surface 410 of sleeve 400 is located adjacent to portion 310 of shaft 200. Inner surface 410 is slidingly and removably engaged with portion 310 of shaft 200. In the preferred embodiment, inner surface 410 of sleeve 400 physically contacts the smooth and tapered surface of portion 310 in shaft 200. In this configuration, sleeve 400 covers portion 310 of shaft 200, but sleeve 400 is devoid of covering end 330 of shaft 200.

As also illustrated in FIGS. 8 and 9, end 330 of shaft 200 is located within recess 620 of cap 600. Furthermore, cap 600 is removably coupled to sleeve 400 by fasteners 801 located within the aforementioned aligned holes of cap 600 and sleeve 400. As an example, fasteners 801 can be screws.

Additionally, hole 640 of cap 600 is preferably substantially collinear with hole 331 of shaft 200. A fastener 900 is located within holes 640 and 331 to removably couple the assembly of cap 600, sleeve 400, and coating 890 to shaft 200. As indicated earlier, cap 600 is coupled to sleeve 400 so fastener 900 also couples sleeve 400 to shaft 200. The purpose of fastener 900 is to provide sufficient force between inner surface 410 of sleeve 400 and the surface of portion 310 of shaft 200 to initiate the locking action of the tapers of surface 410 and the surface of portion 310. Fastener 900 also provides a safety benefit by preventing sleeve 400 from becoming accidentally disengaged from shaft 200. In the preferred embodiment, fastener 900 is rigid and is comprised of stainless steel. As an example, fastener 900 can be a screw.

In this configuration, sleeve 400, cap 600, and shaft 200 all move as one unitary piece when shaft 200 is rotated around the rotational axis. End 340 of shaft 200 can be coupled to a motor or another actuating device to rotate shaft 200 around the axis. In this embodiment, there is no independent motion between sleeve 400, shaft 200, or cap 600.

As indicated earlier, sleeve 400 is a portion of wire guide 150. Wire guide 150 also includes a rigid coating 890. Coating 890 is located around outer surface 420 of sleeve 400. As an example, coating 890 can be comprised of a hard polymer such as double density poly-propylene. The polymer can be chemically bonded or cast onto outer surface 420 of sleeve 400. This bonding or casting process adheres the polymer to surface 420 of sleeve 400 to render coating 890 as one with sleeve 400. As an example, coating 890 can have a thickness of approximately 0.5 to 5 millimeters.

Coating 890 has a plurality of grooves extending around outer surface 420 of sleeve 400. Each of the plurality of grooves serves to hold, position, and guide a wire. FIG. 10 illustrates an enlarged cross-sectional view of a portion of coating 890 in FIG. 9. As illustrated in FIG. 10, coating 890 has symmetrical grooves 1010, each of which are separated by a distance 1011. As an example, distance 1011 can be approximately 0.2 to 5 millimeters, and each of grooves 1010 can have a depth of approximately 0.2 to 1.5 millimeters. In the preferred embodiment, each of grooves 1010 extends continuously and completely around or encircles sleeve 400. Furthermore, each of grooves 1010 preferably defines a plane that is substantially perpendicular to the rotational axis. As illustrated in FIG. 8, the grooves are located along a central section 810 of coating 890. As an example, section 810 can have a length of approximately 0.2 to 90 millimeters.

In the preferred embodiment, the groove in coating 890 that is furthest away from end 330 of shaft 200 is preferably located at a predetermined distance measured from a predetermined location in portion 320 of shaft 200. As an example, the predetermined location in portion 320 can be at the interface between section 321 and body 323. As illustrated in FIG. 8, the predetermined distance is indicated by a distance 820. As an example, distance 820 can be approximately 5 to 10 centimeters. By using the same taper for portion 310 of shaft 200 and for inner surface 410 of sleeve 400, distance 820 can be extremely accurate and repeatable for each of pulleys 110, 120, and 130 in FIG. 1.

A wire 1020 is illustrated within one of grooves 1010 in FIG. 10. Wire 1020 is not illustrated in FIG. 9. Wire 1020 is preferably located within each of grooves 1010. One skilled in the art will understand that wire 1020 is also preferably located within each groove of pulleys 110, 120, and 130 in FIG. 1.

Therefore, an improved machine for cutting brittle materials that has pulleys, which can be assembled precisely and can be disassembled and reused without damaging the wire guides of the pulleys. The tapered mandrels or shafts and the tapered wire guides enable the precise and non-damaging assembly and disassembly of the pulleys. Additionally, the taper is also a locking taper that facilitates the locking of the sleeve onto the shaft, and the rigid taper also ensures the concentricity of the sleeve to the shaft. Furthermore, the pulleys can be assembled without using a hydraulic press. Moreover the plurality of continuous grooves around the complete outer surface of the wire guides provides a robust system for guiding the wires and eliminates the instability problems of the prior art.

Although the invention has been described with reference to specific embodiments, it will be understood by those skilled in the art that various changes may be made without departing from the spirit or scope of the invention. For instance, the numerous details set forth herein such as, for example, the material compositions and the dimensions are provided to facilitate the understanding of the invention and are not provided to limit the scope of the invention. Accordingly, the disclosure of embodiments of the invention is intended to be illustrative of the scope of the invention and is not intended to be limiting. It is intended that the scope of the invention shall be limited only to the extent required by the appended claims.

What is claimed is:

1. A machine for cutting brittle materials comprising:

a first shaft having a first portion with a taper;

a first sleeve having a first inner surface and a first outer surface, the first inner surface having the taper and located adjacent to the first portion of the first shaft;

a first cap coupled to the first sleeve and having a recess, wherein the first shaft has an end located adjacent to the first portion of the first shaft, the end located within the recess of the first cap;

a first coating around the first outer surface, the first coating having a first plurality of grooves extending around the first sleeve and a first fastener coupling the first cap to the first shaft.

2. The machine of claim 1 further comprising:

a second shaft located adjacent to the first shaft and having a second portion with the taper;

a second sleeve having a second inner surface and a second outer surface, the second inner surface having the taper and located adjacent to the second portion of the second shaft; and a second coating around the second outer surface, the second coating having a second plurality of grooves extending around the second sleeve.

3. The machine of claim 2 further comprising:

a third shaft located adjacent to the first and second shafts and having a third portion with the taper;

a third sleeve having a third inner surface and a third outer surface, the third inner surface having the taper and located adjacent to the third portion of the third shaft; and a third coating around the third outer surface, the third coating having a third plurality of grooves extending around the third sleeve.

4. The machine of claim 3 further comprising:

a wire located in and extending between the first, second, and third pluralities of grooves.

5. The machine of claim 3 wherein:

the first shaft, the second shaft, and the third shaft form a triangle.

6. The machine of claim 3 wherein:

the first, second, and third shafts are symmetrical with each other;

the first, second, and third sleeves are symmetrical with each other; and the first, second, and third coatings are symmetrical with each other.

7. The machine of claim 1 wherein:

the first shaft rotates around an axis extending through a central portion of the first shaft;

the first sleeve rotates around the axis with the first shaft; and the first coating rotates around the axis with the first shaft.

8. The machine of claim 7 wherein:
the taper extends along the axis.

9. The machine of claim 7 wherein:
the first outer surface is substantially parallel to the axis.

10. The machine of claim 7 wherein:
each of the first plurality of grooves encircles the first shaft and the first sleeve and defines a plane substantially perpendicular to the axis.

11. The machine of claim 1 wherein:
the first shaft extends through the first sleeve; and
the first inner surface contacts the first portion of the first shaft.

12. The machine of claim 1 wherein:
the end of the first shaft has a first configuration; and
the recess of the first cap has a second configuration to receive the end of the first shaft in a finite number of orientations to prevent the first sleeve from slipping around the first shaft.

13. The machine of claim 1 wherein:
the first shaft rotates around an axis extending through a central portion of the first shaft;
the first shaft has a hole substantially collinear with the axis, extending into the end of the first shaft;
the first cap has a hole extending through the recess of the first cap and substantially collinear with the hole in the end of the first shaft; and
the first fastener is located in the hole of the first cap and the hole in the end of the first shaft.

14. A pulley in a machine for cutting brittle materials comprising:
a mandrel having a length and having a rotational axis along the length and extending through a center of the mandrel, the mandrel being rigid and having a first portion with a taper along the rotational axis, the mandrel having an end adjacent to the first portion, the mandrel having a hole substantially collinear with the rotational axis and extending through the end and into the first portion;
a wire guide comprising:
    a sleeve having an inner surface and an outer surface, the inner surface having the taper along the rotational axis and being slidingly engaged with the first portion of the mandrel, the outer surface substantially parallel to the rotational axis, the sleeve being rigid, and the mandrel extending through the wire guide; and
    a coating on the outer surface of the sleeve, the coating having a plurality of grooves extending around the sleeve, each of the plurality of grooves defining a plane substantially perpendicular to the rotational axis, and each of the plurality of grooves for guiding a wire;

a cap coupled to the sleeve of the wire guide and having a recess, the end of the mandrel located within the recess of the cap, the cap being rigid and having a hole extending through the recess of the cap and substantially collinear with the hole in the end of the mandrel; and a fastener located in the hole of the cap and the hole in the end of the mandrel to couple the cap to the mandrel, the fastener being rigid.

15. The pulley of claim 14 wherein:
the taper is greater than zero degrees and less than approximately five degrees as measured from the rotational axis.

16. The pulley of claim 14 wherein:
the mandrel rotates around the rotational axis;
the wire guide rotates around the rotational axis with the mandrel; and
the cap rotates around the rotational axis with the wire guide and the mandrel.

17. The pulley of claim 16 wherein:
the end of the mandrel has a first configuration; and
the recess of the cap has a second configuration to receive the end of the mandrel in one of only two orientations to prevent the wire guide from slipping around the mandrel.

18. The pulley of claim 14 wherein:
the cap has an end, the hole in the cap extending through the end of the cap, the end having a polygon shape.

19. The pulley of claim 14 wherein:
a first one of the plurality of grooves is located furthest away from the end of the mandrel and located at a predetermined distance measured from a predetermined location at a second portion of the mandrel, the second portion of the mandrel adjacent to the first portion of the mandrel.

20. The pulley of claim 14 wherein:
the first portion of the mandrel has a smooth surface;
the inner surface of the wire guide is smooth; and
the sleeve covers the first portion of the mandrel and is devoid of covering the end of the mandrel.

21. The pulley of claim 14 wherein:
the sleeve is removable from the mandrel;
the cap is removable from the sleeve; and
the fastener is removable from the cap and the mandrel.

22. The pulley of claim 14 wherein:
the coating is comprised of polypropylene.

* * * * *